(No Model.) 6 Sheets—Sheet 2.

J. COWMAN & E. SIDE.
Cigarette Machine.

No. 240,507. Patented April 26, 1881.

WITNESSES.
Chas. P. Gill
Jas. F. Ryan

INVENTORS,
John Cowman
and
Edgar Side,
By their Attys
Cox and Cox.

(No Model.) 6 Sheets—Sheet 3.
J. COWMAN & E. SIDE.
Cigarette Machine.
No. 240,507. Patented April 26, 1881.
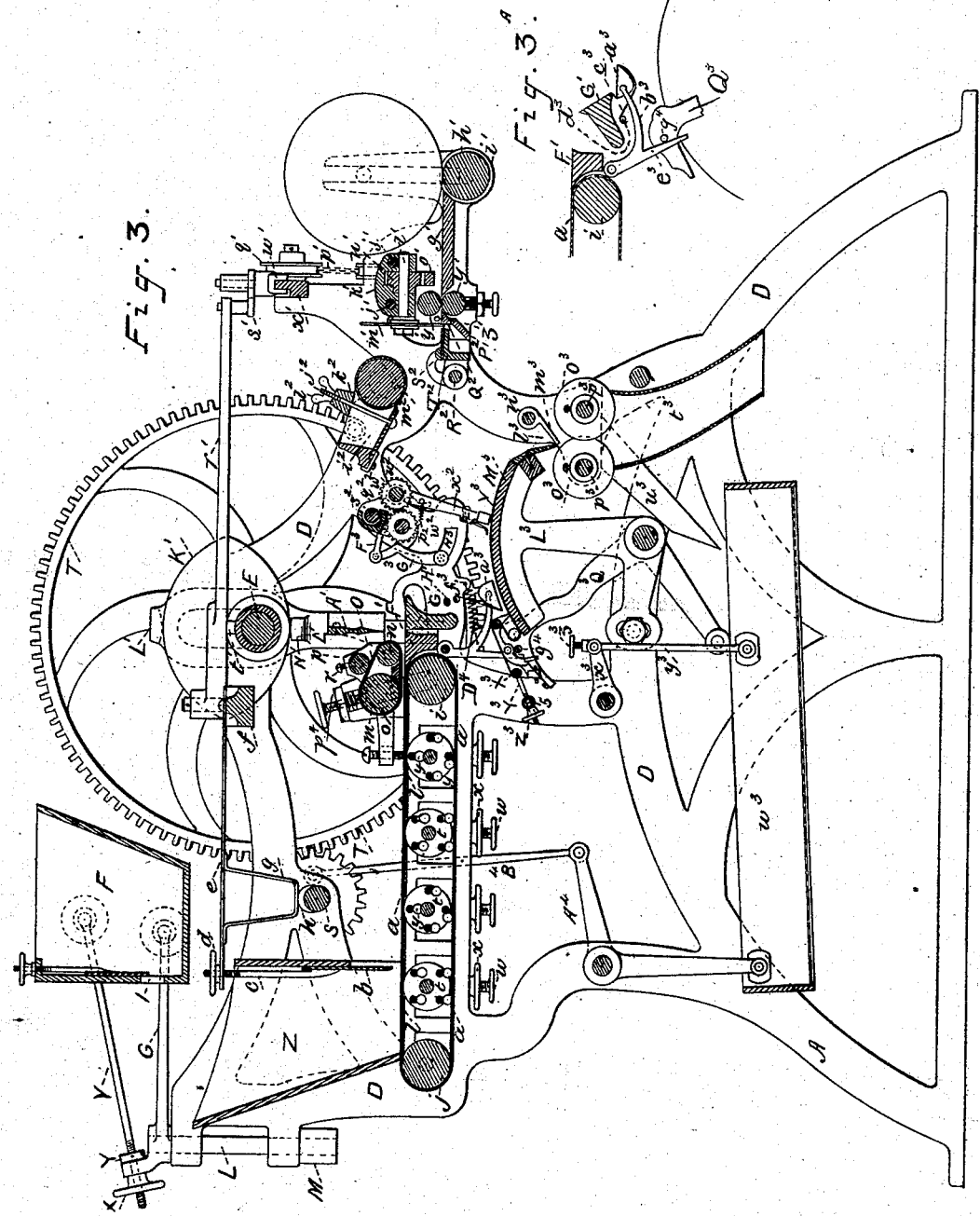
WITNESSES.
Chas. B. Gill
Jas. F. Ryan
INVENTORS
John Cowman
and
Edgar Side,
By their Attys.
Cox and Cox (No Model.)  6 Sheets—Sheet 4.
J. COWMAN & E. SIDE.
Cigarette Machine.
No. 240,507.  Patented April 26, 1881.
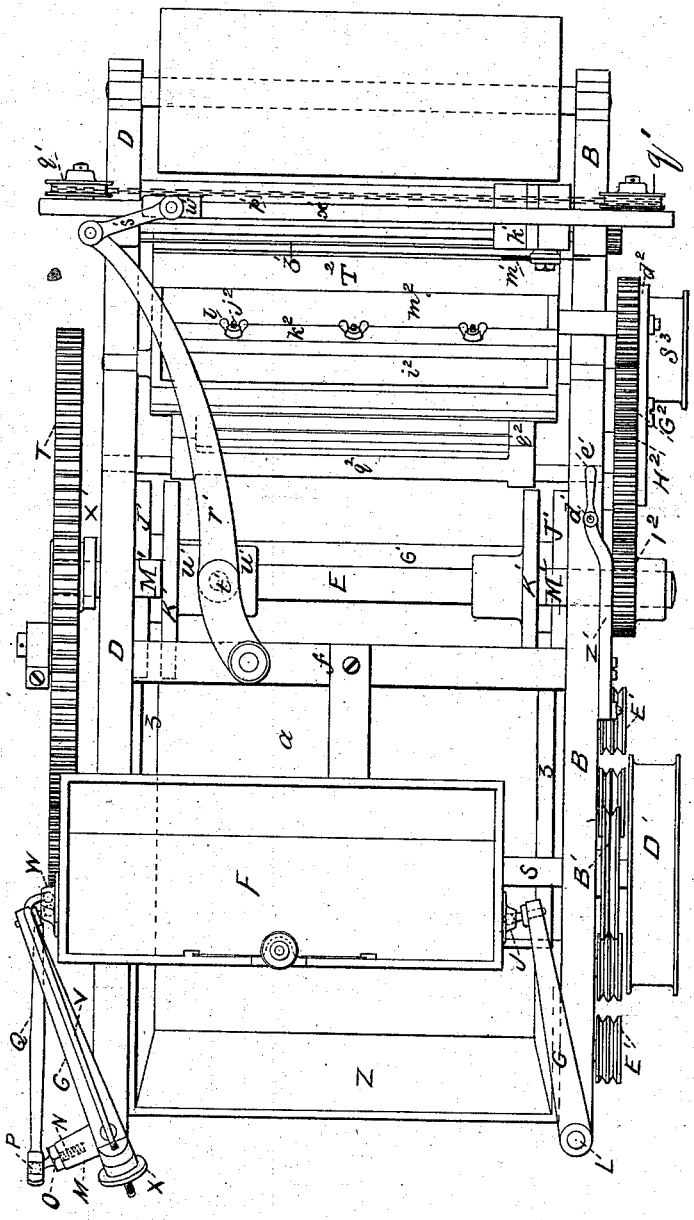
WITNESSES.
Chas. P. Gill
Jas. F. Ryan
INVENTORS,
John Cowman
and
Edgar Side
By their Attys,
Cox and Cox (No Model.) 6 Sheets—Sheet 5.
J. COWMAN & E. SIDE.
Cigarette Machine.
No. 240,507. Patented April 26, 1881.
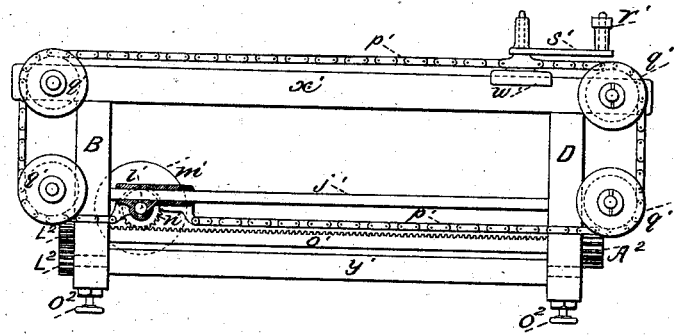
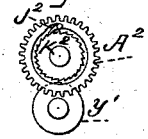
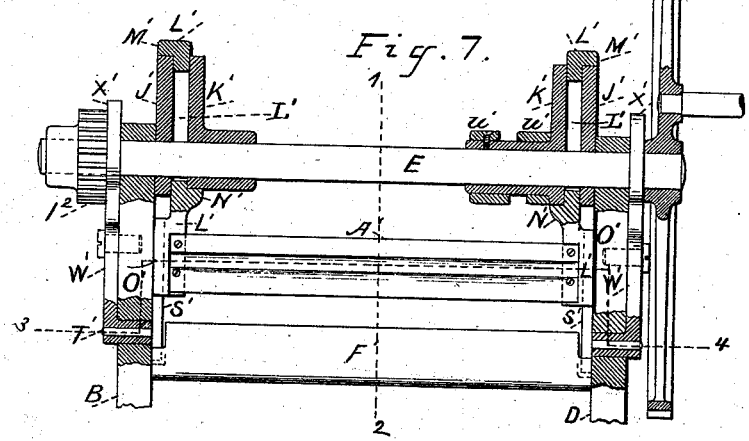
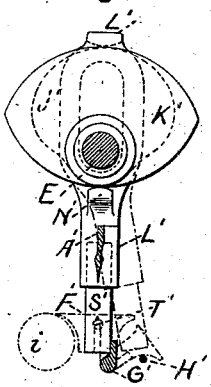
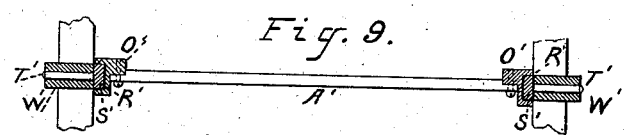
WITNESSES.
Chas. C. Gill
Jas. F. Ryan
INVENTORS;
John Cowman
and
Edgar Side
By their Atty's
Cox and Cox

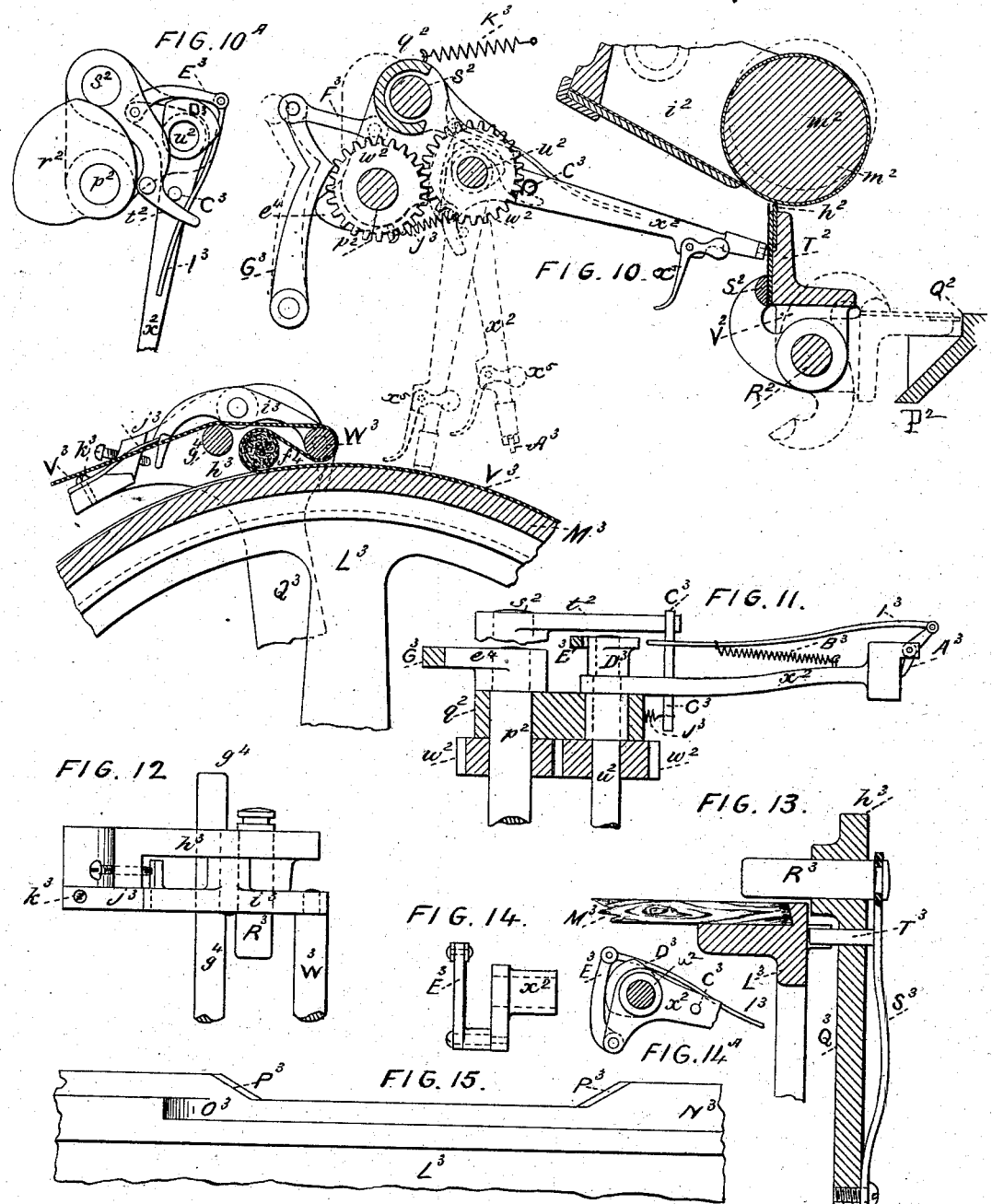

UNITED STATES PATENT OFFICE.

JOHN COWMAN, OF NEW YORK, AND EDGAR SIDE, OF BROOKLYN, E. D., ASSIGNORS, BY MESNE ASSIGNMENTS, TO THE COWMAN MANUFACTURING COMPANY, OF NEW YORK, N. Y.

CIGARETTE-MACHINE.

SPECIFICATION forming part of Letters Patent No. 240,507, dated April 26, 1881.

Application filed October 6, 1880. (No model.)

*To all whom it may concern:*

Be it known that we, JOHN COWMAN, of the city, county, and State of New York, and EDGAR SIDE, of Brooklyn, E. D., in the county of Kings and State of New York, have invented a new and useful Improvement in Cigarette-Machines, of which the following is a specification, reference being had to the accompanying drawings.

The invention relates to an improvement in machines for making cigarettes, as will be hereinafter fully described, and particularly pointed out in the claims.

The objects of the invention will be understood from the detailed description hereinafter presented.

Figure 1:
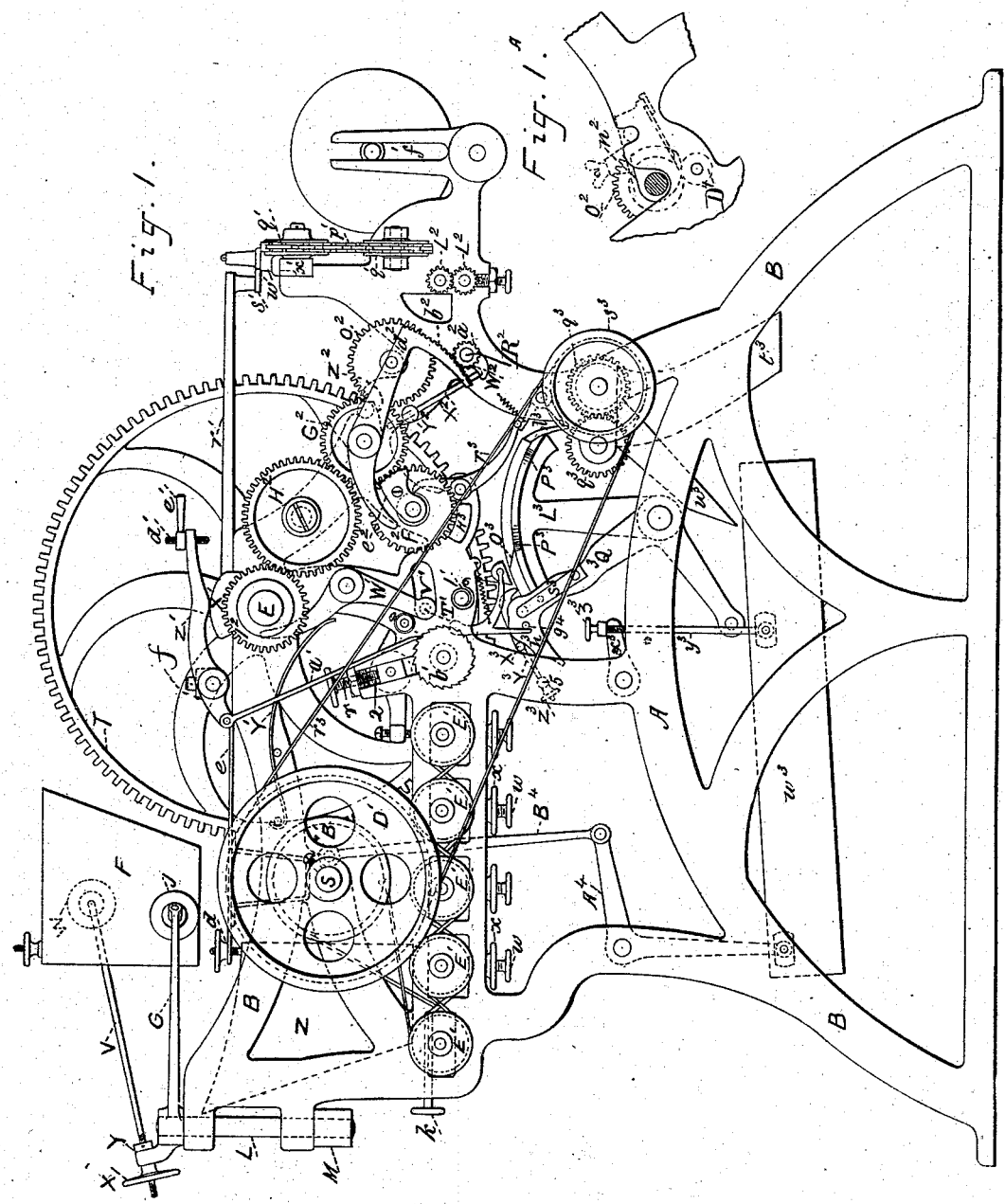
Figure 2:
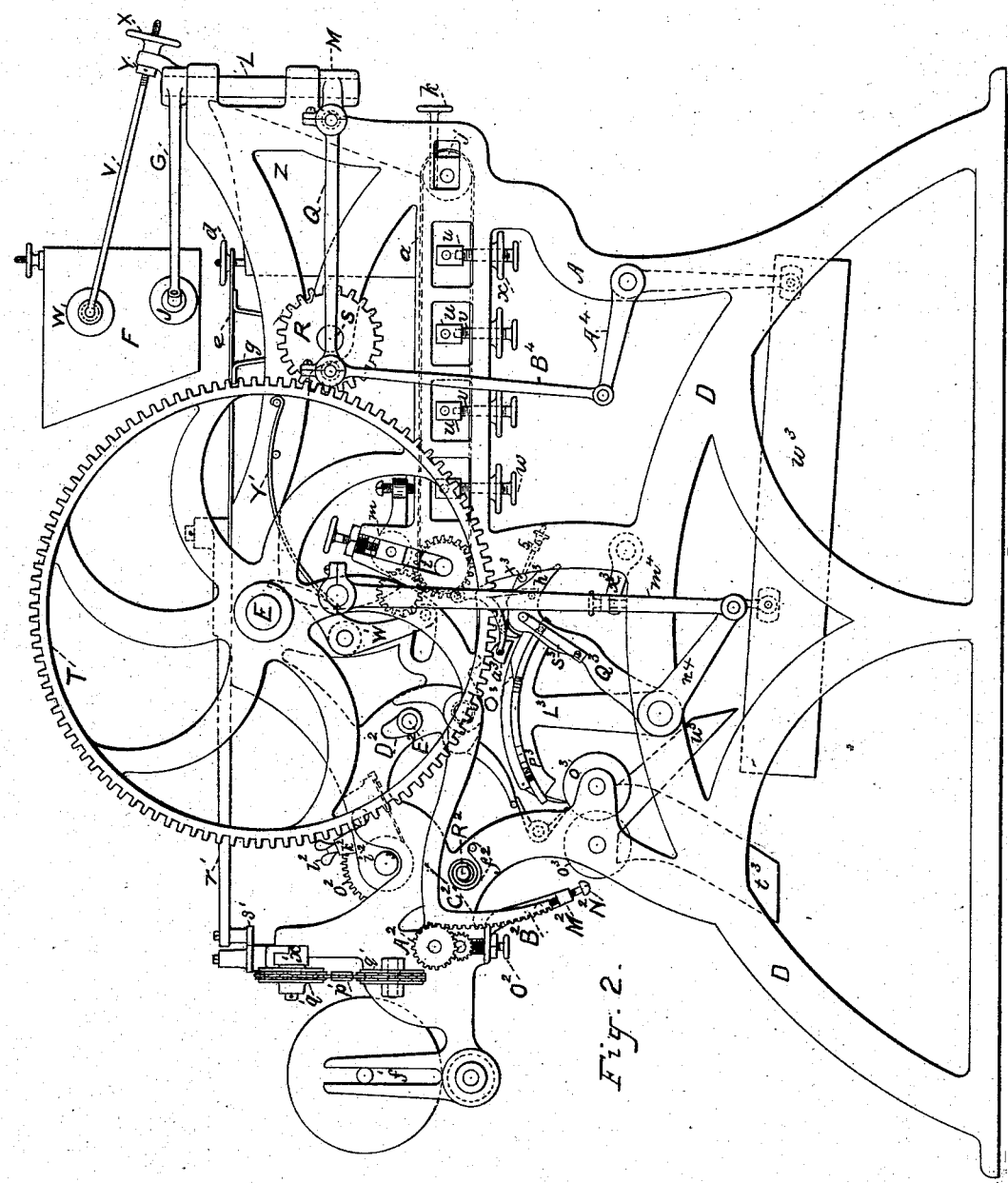

Referring to the accompanying drawings, Figure 1 is an elevation of the right-hand side of the machine which is the subject of this application. Fig. 1$^A$ is a detached view of the end of the paste-trough and attachments, which are hidden in Fig. 1. Fig. 2 is an elevation of the left-hand side of the machine. Fig. 3 is a central vertical longitudinal section of same. Fig. 3$^A$ is a detached sectional view of the tilting bar G′ and the trough $a^3$, shown in a different position from that illustrated in Fig. 3. Fig. 4 is a top view of the machine. Fig. 5 is a front view of the mechanism actuating the cutter $m'$. Fig. 6 is a detached view of the pinion, pawl, and ratchet secured on the end of the upper feed-roller, $y'$. Fig. 7 is a vertical transverse section through that portion of the machine operating and connected with the knife A′. Fig. 8 is a vertical section through the line 1 2 of Fig. 7. Fig. 9 is a section through the line 3 4 of Fig. 7. Fig. 10 is a detached longitudinal section, showing the tilting table T$^2$ in an upright position, the arms $x^2$ thrown forward in position to take the strip of paper from said tilting table, and the flexible sheet V$^3$ in the act of rolling a strip of tobacco, the dotted lines showing the different positions of the arms $x^2$ as they descend to deliver the strip of paper on the flexible sheet in proper relation to be rolled up with the rod of tobacco. Fig. 10$^A$ is a view of the left-hand end of the carriage $q^2$, showing one of the arms $x^2$ in a vertical position, and the mechanism whereby it is thrown forward. Fig. 11 is a top view, partly in section, of one of the arms $x^2$ and connections. Fig. 12 is a top view of the lever $i^3$ and the upper end of the bar Q$^3$ and attachments. Fig. 13 is a detached vertical transverse section through one of the bars Q$^3$, showing the relation of the short rod R$^3$ to the table M$^3$. Fig. 14 is a detached view of the rear ends of the arms E$^3$ and $x^2$. Fig. 14$^A$ is a detached side view of the rear portion of said arms E$^3$ and $x^2$ with their connections. Fig. 15 is a broken top view of one of the plates N$^3$ secured upon the segmental ends L$^3$.

In the accompanying drawings, A indicates the frame of the machine, consisting of the two sides B D, suitably mounted and connected.

E represents the main axle of the driving mechanism of the machine, which, when rotated as hereinafter described, operates the mechanisms actuating the different parts of the machine hereinafter referred to.

Upon the rear end of the machine is the trough F, which is suspended by the arms G at each end thereof, so as to have a swinging lateral movement when the machine is in operation, for the purpose of thoroughly shaking up the tobacco placed in it by throwing the same violently from side to side. In the bottom of the trough F, at a point about the center of its rear edge, is formed the opening I, of suitable size to permit the escape of a sufficient quantity of the tobacco to feed the machine. The front ends of the arms G are rounded and fitted into sockets J fastened to the sides of the trough F, and constituting ball-and-socket joints. The rear ends of the arms G extend from the sides of the trough to the rear corners of the sides B D, and are secured upon the upper ends of the vertical rods L, the lower ends of which pass downward a suitable distance through bearings, and are capable of a rotary movement therein.

Upon the lower end of one rod, L, at the left of the machine, is affixed, by means of a set-screw, the knuckle M, in the outer end of which is inserted a screw, N, having a locking-nut, O, and a ball-head, P, which fits into a suitable socket on the rear end of the pitman-rod Q, which extends toward the front of the machine, and is journaled eccentrically on an axle on the face of the pinion R, mounted upon the end of the shaft S, and meshing into the spur-gear wheel T, secured upon the end of the axle E. When power is applied to the axle S the movement is communicated, through the pinion R, to the gear-wheel T and pitman Q, which latter, being eccentrically mounted, is driven backward and forward with every revolution of the pinion. This movement of the pitman is communicated to the knuckle M and rods L, giving them a semi-rotary movement, which, in turn, operate the arm G, secured on the upper end of the rod, to move laterally, the rod acting as a pivot. The horizontal swinging movement of the arm G just described serves to draw and retract the trough laterally and actuates the other arm G on the right of the machine, which arm serves as a support for the right-hand end of the trough and insures its free movement.

Above the arm G, on the left of the trough, is arranged the arm V, the front end of which is in the form of a ball, and is mounted in a socket, W, which is similar to the sockets J, before mentioned. The rear end of the arm V is threaded and passes through a bearing formed on the rear end of the arm G, and is provided on its extremity with a set-screw, X, the body of which is inclosed in the said bearing, and has upon its front end, in front of the bearing, a collar, Y, fastened by a screw or pin, and which prevents the set-screw losing its position. Within the bearing of the rear end of the arm V will be supplied a small spring, for the purpose of preventing any rattling of the parts when actuated. The purpose of the arm V and set-screw X is to adjust the inclination of the trough F, and thereby control the quantity of the tobacco leaving the mouth or opening I. By turning the screw X to the left the arm V will be worked forward, and will tilt the upper portion of the trough F to the front, restraining thereby, in a degree, the efflux of tobacco. When the movement of the screw X is reversed the trough F will be tilted toward the rear and the tobacco allowed to pass freely through the mouth I.

Below the rear portion of the trough F, and secured between the sides B D, is a trough, Z, the sides of which taper inward toward their lower ends and extend downward in proper relation to the upper rear portion of the traveling apron a.

Upon the inner face of the front side of the trough Z is placed a thin plate, b, preferably sustained in a vertical position by suitable studs or guides provided in the ends of the trough.

At the vertical center of the plate b is secured a rod, c, the upper end of which is threaded and supplied with a set-screw, d, by which it and the said plate may be adjusted vertically. One end of the spring-bar e rests under the set-screw d, while its opposite end is screwed to a cross-bar, f, connecting the two sides B D.

To the central portion of the lower side of the bar e is fastened the V-shaped bar g, which extends downward in close relation to the central parts of the shaft S, whereon is supplied an eccentric, h, which, as the shaft S is rotated, comes in contact with the bar g and forces it upward, and also allows it to descend. This movement of the bar g is communicated to the bar e and plate b, which, as it is successively forced upward and lowered, operates to smooth the surface of the tobacco carried from the hopper Z by the traveling apron a. By means of the set-screw d the plate b may be adjusted vertically, according to the quantity of the tobacco that is to be allowed to pass from the hopper onto the apron.

The apron a consists of an endless piece of flexible material mounted upon rollers i j journaled in the sides of the machine. The bearings of the rear roller, j, are mounted in slots, and are adjustable laterally by means of the set-screw and nut k, whereby the tension of the apron on the rollers may be increased or diminished at will. A metal plate, l, will be provided between the rollers i j, immediately below the upper half of the apron, for the purpose of sustaining it and the weight of the tobacco upon it, and for other reasons hereinafter mentioned.

Over the front end of the apron a are provided the parallel horizontal rollers m n, which are in close relation to the apron, and have their ends journaled in the sides of the machine. The rollers m n will be connected by a belt, o, and between them, if desired, will be supplied a suitable plate to prevent the lower portion of the belt being sagged in by the pressure of the tobacco passing below it on the apron a.

Upon the left-hand end of the roller n is provided a pinion-wheel, which gears into a similar wheel upon the end of the roller i, and is rotated by it, whereby the movement of the apron a is made simultaneous with the roller n operating the belt o.

Centrally over the belt o is arranged a roller or shaft, p, the ends of which are journaled in slots 2, and are adjustable by means of the screws r. The purpose of the roller p is, by its vertical adjustment, to take up any slack in the belt o between the rollers m n.

Between the two horizontal halves of the apron a are arranged a series of parallel shafts, t, having their ends journaled in bearings u, adjustable vertically by means of and resting upon the screws v, provided upon their lower ends with the nuts w x, the former serving to set the screw, the latter to lock it in position. Upon the shafts t are arranged a series of short arms or beaters, y, which, when the shafts are rotated, are designed to strike the plate l, so as to give it a trembling movement while the tobacco is passing over the apron a above it. The plate l being close to the upper surface of the apron, the trembling movement is felt by the tobacco, and causes it to settle and retain its sheet condition. By adjusting the shafts $t$ vertically it is plain that the force of the beaters $y$, striking the plate $l$, may be increased or diminished to suit the varied conditions of the tobacco.

Upon the apron $a$ are provided the guides $z$, one being at each side, the object of which is to retain the sheet of tobacco in a uniform width and guide it to the knife $A'$, hereinafter described. The guides $z$ may be made adjustable toward each other, if desired, so that the width of the sheet of tobacco may be regulated at will.

Upon the right-hand extremity of the shaft S are mounted the band-wheels $B'$ $D'$, and on the right-hand end of each of the shafts $t$ is mounted a smaller band-wheel, $E'$, all of which are connected with the wheel $B'$ by a suitable belt or band, by which movement is communicated from the shaft S to the shafts $t$, which operate the beaters $y$.

In front of the roller $i$ the way is continued forward by a bar or narrow platform, $F'$, of metal, and in front of this is pivoted, between the sides of the machine, a tilting bar, $G'$, which, when upright, fits closely against and is flush with the upper surface of the platform $F'$. A bar, $H'$, is supplied in front of the tilting bar $G'$, for the purpose of preventing it from swinging too far forward.

Upon the pivot at the right-hand end of the tilting bar $G'$ is a secured a spring, $I'$, which, after the bar has been forced forward and the actuating pressure has been relieved, retracts the same to its former position against the platform $F'$.

Upon each end of the axle E, within the sides B D, are mounted the cams $J'$ $K'$, and between these cams, at each end of the shaft, are arranged so as to have a pivotal movement thereon the carriers $L'$, the upper ends of which constitute short arms $M'$, which extend over the cams $J'$ above mentioned, and are influenced by them. Below the cams $K'$ the carriers $L'$ are supplied with the shoulders or projections $N'$, which are acted upon by the cams, as hereinafter set forth.

Upon the lower portions of the carriers $L'$ are formed the blocks $O'$, one being at each side of the machine, between which is firmly secured the knife $A'$. The outer faces of the blocks $O'$ are cut to form the grooves $R'$, which fit over the blocks $S'$. The lower ends of the blocks $S'$ are connected by pins $T'$, passing through the slots $V'$, with the lower ends of the bell-crank arms $W'$, which are pivoted to the sides B D, and are arranged so that their upper ends impinge the cams $X'$ secured upon the axle E. The springs $Y'$ are furnished to retain the upper portions of the bell-crank arms against the cams $X'$.

Upon the cam $X'$, at the right-hand end of the machine, rests the arm $Z'$, the rear portion of which is pivoted in a bearing on the end of the cross-bar $f$. The rear extremity of the arm $Z'$ has pivoted upon it the long pawl $a'$, which engages the teeth of the ratchet $b'$, secured on the end of the roller $i$, that carries the apron $a$, and this pawl serves to rotate it at proper intervals, as hereinafter specified. The length of the movement of the pawl $a'$, and the distance, consequently, that the roller $i$ shall be rotated at any one interval, is controlled by means of the screw $d'$, set in the front end of the arm $Z'$. The lower end of the screw $d'$ strikes the edge of the frame of the machine, when the movement of the arm $Z'$ has impelled the pawl $a'$ far enough, and arrests the said movement. By adjusting the screw $d'$ vertically the length of this movement may be governed at will. A locking-nut, $e'$, is supplied for the purpose of retaining the screw in any set position.

For the purpose of explaining the operation and effect of the cams and arms above described, let us suppose that the tilting bar $G'$ is in position against the edge of the platform $F'$, and that the knife $A'$ is vertically above the joint formed by the contact of said bar and platform. It is supposed that when these devices are in the positions described there will be a sufficient quantity of the sheet of tobacco fed by the apron $a$ on the tilting bar $G'$ to form one long cigarette. The axle E is now rotated toward the front of the machine in the customary manner, which causes the cams $J'$, $K'$, and $X'$ to rotate. This movement first causes the cams $K'$ to exert a downward pressure upon the projections $N'$, and drives thereby the lower ends of the blocks $O'$ and the knife $A'$ downward. The lower ends of the blocks $O'$ pass downward between the extremities of the tilting bar $G'$ and the platform $F'$, while the knife $A'$ passes downward between and separates the contact of the said bar and platform, and severs that portion of the sheet of tobacco that was on the tilting bar. The cam $X'$ now allows the front end of the arm $Z'$ to lower, and the cam then forces the upper ends of the bell-crank levers or arms $W'$ toward the rear. The lowering of the front end of the arm $Z'$ causes the rear end thereof to elevate, which carries the point of the pawl $a'$ upward on the ratchet $b'$ two or three teeth, or any space, according to the adjustment of the screw $d'$, as hereinbefore set forth. The effect of the cam $X'$ forcing the upper end of the bell-crank arm or lever toward the rear, as above described, is to drive its lower end toward the front, which movement is communicated through the pins $T'$ to the blocks $O'$, carriers $L'$, and the knife $A'$, all of which are inclined forward, and the blocks $O'$, being in contact with the tilting-bar $G'$, tilts it forward onto the rod $H'$. The tilting forward of the bar $G'$ acts to throw the severed strip of tobacco above mentioned into a trough, which will be hereinafter described. The revolution of the shaft E continuing, the lower ends of the blocks $O'$ pass beyond the extremities of the tilting bar $G'$, which, then being left free, is instantly drawn back against the platform $F'$ by the tension of the spring $I'$. When the bar $G'$ flies back to its vertical position its upper edge passes very closely under the edge of the knife A', which, should the strip of tobacco not fall from the tilting bar readily, will knock it off into the trough mentioned. After the tilting bar G' has resumed its position in contact with the platform F' the greatest eccentricity of the cam X' passes beneath the front end of the arm Z', raising it, and consequently lowering its rear end, which depresses the pawl a' and causes the ratchet b' to rotate a given distance. The rotation of the ratchet b' actuates the roller i to revolve it, which causes the apron a to travel forward a distance corresponding with that of the rotation of the ratchet b'. When the cam X' is in such position as to raise the front end of the arm Z' it will permit the springs Y' to force the upper ends of the crank arms or levers W' forward. This draws the lower ends of the arms W' rearward to their former position and returns the knife A' to a vertical position above the edge of the platform F', when it is in proper position to be operated to sever another strip of tobacco from the sheet fed forward by the apron a. The movements of the cams, arms, and knife above set forth occur at each revolution of the shaft E. Thus each time the said shaft is revolved a strip of tobacco is cut off and thrown forward and the sheet fed forward in position for the severing of another strip.

Upon the front end of the machine are arranged the devices for feeding and cutting off the paper for wrapping the strip of tobacco to form the cigarettes. The roll of paper will be mounted in the vertical guides f' at a proper elevation to feed the paper onto the horizontal paper-board g' without crimping. For the purpose of facilitating the operation of the paper-roll, there is mounted between the guides f', and below it, the roller h', having shoulders i' at each end, between which the roll of paper is placed. Above the inner portions of the paper-board g', and extending from one side of the machine to the other, are secured the two parallel horizontal guide-rods, j', upon which is mounted the carriage k', which is adapted to travel backward and forward horizontally from one side of the machine to the other, and has journaled in its lower portion, which extends below the rods j', the axle l', upon the rear end of which is secured the cutting-wheel m', and upon the front portion the pinion n'. The wheel or knife m', when the carriage k' is operated, travels along the rear edge of the paper-board g' and operates to cut off a strip of paper from the paper-roll, as hereinafter described. The pinion n' meshes with the teeth of the rack o', secured between the sides of the machine a suitable distance above the paper-board g', and when the carriage is moved serves to rotate the axle l', and with it the knife m'. The carriage is drawn back and forth by the movement of a chain or belt, p', which passes over the four pulleys q', and has its ends secured on opposite sides of the carriage. Thus as the chain is caused to travel over the pulleys it will draw the carriage correspondingly over the rods j' and cause the knife to cut off a strip of paper. The bearings of the two upper pulleys, q', are adjustable laterally, in order that they may be made to take up all slack in the chain. For the purpose of giving the chain p' the proper movement it will be operated from the axle E through the arms r' s'. The rear end of the arm r' will be pivoted to the cross-bar f, and will have a stud, t', on its lower surface, which will come in contact with the cam u' on the axle E. The front portion of the arm r' will extend forward in proper relation to the chain p', and has pivoted in its extremity one end of the short arm s', the other end of which is clamped on the chain p', and is furnished with a grooved block, w', which fits over the upper edge of the guide-rod x', whereby the movement of the said arm s' and the chain p' is always in a direct line across the machine. The rotation of the shaft E will cause the cam u', acting through the stud t', to force the arm r' to oscillate horizontally upon the pivot securing it to the bar f, whereby the front end of the arm r', with the arm s' and its connections, will be driven transversely across the machine. This movement of the arm s' is communicated, through the chain p' and carriage k', to the knife m' and pinion n'.

Upon the rear edge of the paper-board g' is arranged a pair of rollers, y', and a small rod, z'. The rollers y' are journaled between the sides of the machine, and arranged one directly above and in close contact with the other, and are geared together.

Upon the left-hand end of the upper roller y' is a pinion, $A^2$, which meshes with the teeth on the rack $B^2$ and is rotated by it. The rack $B^2$ is formed upon the front end of the arm $C^2$, which is pivoted at its rear to the side of the machine, and has its rear extremity placed in contact with the cam $D^2$, secured upon the end of the shaft $E^2$, which extends across the machine, and is supplied on its right-hand end with the gear-wheel $F^2$. The wheel $F^2$ is connected with the axle E through the gear-wheels $G^2$ $H^2$ $I^2$, (the last named being secured on the axle E,) and is operated by it to rotate the shaft $E^2$ and cam $D^2$, which, as it turns, alternately depresses the rear end of the arm $C^2$, and it is permitted to return to its former position by its weight. The depression of the rear end of the arm $C^2$ causes its front portion, carrying the rack $B^2$, to elevate, which movement of the rack rotates the pinion $A^2$ and the upper feed-roller y'. When the eccentricity of the cam $D^2$ has passed the extremity of the arm $C^2$ the arm and rack $B^2$ fall of their own weight to their former position. This latter movement of the rack $B^2$ rotates the pinion $A^2$ in the reverse direction, and does not affect the feed-rollers, the pinion being loosely mounted and connected with the upper feed-roller through a spring-pawl, $J^2$, the point of which enters the teeth of the ratchet $K^2$, rigidly secured on the end of said upper feed-roller. When the rack $B^2$ is elevated the point of the pawl $J^2$ forces the ratchet $K^2$ and upper roller $y'$ to rotate; and when it is depressed it slides over the ratchet, leaving the said feed-roller unaffected. The right-hand ends of the feed-rollers $y'$ are supplied with the gear-wheels $L^2$, by means of which the movement of the upper roller is communicated to the lower, and both rollers are rotated in the same direction. When the rack $B^2$ is depressed its lower end rests upon the stop $M^2$, which is furnished with the set-screw $N^2$, the purpose of which is to regulate the extent of the movement of the rack $B^2$, and consequently the distance the feed-rollers $y'$ shall rotate and the length of paper to be fed and cut off. By working the screw $N^2$ upward the sweep of the rack $B^2$ is diminished, and the rotation of the feed-rollers and the quantity of paper fed are correspondingly diminished. The withdrawal or lowering of the set-screw $N^2$ produces a contrary effect upon the feed-rollers. The lower feed-roller $y'$ is journaled in bearings which are adjustable vertically by means of set-screws $O^2$. In inserting the edge of the paper between the rollers $y'$ it will be desirable to lower the lower one slightly, so as to permit the insertion to be readily made without danger of crimping the paper, after which the roller is adjusted in close relation to the upper roller again. The small rod $z'$ is supplied for the purpose of preserving the extreme edge of the paper from danger of becoming irregular or rolling up as the knife revolves across it.

In rear of the feed-rollers $y'$ the paper-board $g'$ is continued rearward by the metallic bar $P^2$, having an inclined rear edge, and having a shoulder, $Q^2$, adjacent to its rear edge, against which the knife severs the paper.

In rear of the bar $P^2$ is journaled, between the sides of the machine, the shaft $R^2$, upon which is arranged a series of clamps, $S^2$, and a bar, $T^2$. The ends of the bar $T^2$ are supplied with collars $V^2$, through which the shaft $R^2$ passes.

Upon the collar $V^2$, at the right-hand end of the shaft $R^2$, is furnished a lug having a socket, $W^2$, in which rests the lower end of a rod, $X^2$, the upper end of which passes upward through an aperture in the guide $Y^2$ in proper relation to the cam $Z^2$, secured upon the axle of the gear-wheel $G^2$.

Upon the extremity of the shaft $R^2$ is a small pinion, $a^2$, which meshes with the teeth of the rack $b^2$, formed upon the end of the arm $d^2$, which is secured upon the outer extremity of the axle of the gear-wheel $G^2$, its rear end terminating in proper relation to the cam $e^2$, secured upon the face of the gear-wheel $F^2$.

Upon the left-hand end of the shaft $R^2$ is provided a spring, $f^2$, to throw the clamps $S^2$ back to place when they have been tilted rearward, and upon the collar $V^2$, at the left-hand end of the machine, will be supplied a similar spring, for the purpose of retracting the bar $T^2$ when it has been forced rearward from the rear edge of the bar $P^2$. The front edge of the bar $T^2$ is supplied, preferably, with a strip of flexible material, $h^2$, for the purpose hereinafter mentioned, which may be secured in place by inserting its edge in a groove formed in the bar, or otherwise, as may be desired. The strip $h^2$ may be dispensed with, if desired, but I prefer to employ it, as it facilitates the operation of the machine. When the bar $T^2$ is in its normal position its front edge will rest against the bar $P^2$ and its upper surface will be on the same horizontal plane with the paper-board $g'$.

At a suitable elevation above and in rear of the bar $T^2$ is arranged in bearings the paste-trough $i^2$, consisting of a casing of proper dimensions, having a spring-bottom screwed to the casing at its rear edge, the front portion of the bottom being held in place by the screws $j^2$, which project upward through the bar $k^2$, whereon they are supplied with nuts $l^2$, by means of which and the screws $j^2$ the bottom of the trough may be adjusted with relation to the paste-roller $m^2$, forming the front of the trough, and the exit of the paste thereby regulated. The axle of the roller $m^2$ has upon its right-hand end a cam, $n^2$, and a gear-wheel, $o^2$, which meshes with the gear-wheel $G^2$, and is operated by it.

In rear of the paste-trough $i^2$ is journaled, in the sides of the machine, the shaft $p^2$, upon which is mounted the rocking carriage $q^2$, and upon the left-hand end the cam $r^2$. In the carriage $q^2$ is journaled the shaft $s^2$, having secured upon its ends the arms $t^2$ and the shaft $u^2$, which will be connected with the shaft $p^2$ by gear-wheels $w^2$, so that each will have a similar movement at the same time. The arm $t^2$, at the right-hand end of the shaft $s^2$, hangs down in near relation to the cam $r^2$ at the end of the shaft $p^2$.

Upon the ends of the shaft $u^2$ are loosely mounted the arms $x^2$, which extend forward, and have pivoted in the outer edges of their ends the fingers $A^3$, which are clamped against the faces of the ends of the arms $x^2$ by the springs $B^3$.

Near the upper ends of the arms $x^2$ are provided pins $C^3$, which rest in pockets formed in the arms $t^2$, and which impart the motion of the arms $t^2$ to the arms $x^2$.

Upon the ends of the shaft $u^2$ are secured cams $D^3$, which will operate at the proper time to draw the levers $E^3$ and arms $I^3$ (which extend from the fingers $A^3$) upward and remove the contact of the fingers $A^3$ from the ends of the arms $x^2$. The rods or arms $I^3$ are pivoted at their lower ends in the outer extremities of the pivoted fingers $A^3$, their upper ends being pivotally connected with the levers $E^3$, which are pivoted to the carriage $q^2$.

Upon the left-hand end of the carriage $q^2$ is pivoted an arm or link, $F^3$, having its outer or rear end connected by a pivot to the upper end of the lever $G^3$, the lower end of which is adjustably secured in the slot $H^3$ by a set-screw, the purpose of the adjustment being to govern the sweep of the rocking carriage $q^2$ and its connections.

Upon the left-hand end of the shaft $p^2$ is mounted a cam, $e^4$, which operates, through the lever $G^3$ and arm $F^3$, to tilt the carriage $q^2$ rearward.

Springs $J^3$ will be supplied at suitable points beneath the ends of the carriage $q^2$, for the purpose of giving the arms $x^2$ a downward tension. The carriage $q^2$ will be supplied with springs $K^3$, which extend from the ends of the carriage to the sides B D, and operate to draw the carriage forward after it has been tilted rearward in the operation of the machine.

Below and a proper distance in front of the knife A' are pivoted in opposite sides of the machine the segmental ends or frames $L^3$, the curved surfaces of which are up and are cut away on their upper inner edges, forming angular recesses of sufficient depth to admit the board table $M^3$, which extends from one segmental frame or end, $L^3$, to the other, whereby a table having a convex upper surface is formed entirely across the machine.

Upon the outer surface of the ends $L^3$, adjacent to their upper edges, are rigidly secured the curved bars $N^3$, having cams $O^3$ on their upper surfaces and the cams $P^3$ on their vertical faces.

Upon the ends of the shaft securing the segmental frames $L^3$ in place are journaled the oscillatory bars $Q^3$, which extend upward slightly above the plane of the table $M^3$, where they are provided with apertures, in which are loosely inserted the studs or short rods $R^3$, the outer ends of which protrude outward beyond the bars $Q^3$, where they have annular grooves, in which the upper ends of the spring-bars $S^3$ are inserted, said ends being suitably conformed to fit in the grooves. The lower ends of the spring-bars $S^3$ are screwed firmly upon the outer surfaces of the bars $Q^3$.

Upon the inner faces of the bars $S^3$ are secured the studs $T^3$ at points about on a line with the cams $P^3$. The rods $R^3$ extend inward about three-fourths of an inch at each side over the table $M^3$. When the bars $Q^3$ are at the rear of the table their upper ends and the short rods $R^3$ are forced outward by the studs $T^3$ running over or upon the rear cams $P^3$; but when the bars $Q^3$ are impelled frontward the studs $T^3$ ride down the rear cams $P^3$ and allow the upper ends of the bars $S^3$ to lie flat against the bars $Q^3$, which has the effect of forcing the rods $R^3$ inward over the edge of the table $M^3$. When, in their forward movement, the bars $Q^3$ come opposite to the front cams $P^3$, the studs $T^3$ will ride up them and force the upper ends of the bars $S^3$ outward, thereby withdrawing the short rods $R^3$ from over the edges of the table $M^3$.

Upon the front edge of the table $M^3$ is secured, by a clamp or in any other appropriate manner, the front edge of a sheet of rubber or other suitable flexible material, $V^3$, which passes rearward from the said front edge over the entire upper surface of the table, and at the rear portions of which its edges are passed under the short rods $R^3$, after which the sheet is carried upward and forward a given distance and over the rod or roller $W^3$ extending across the machine, and then carried backward and hooked or otherwise secured upon the rod $X^3$ in rear of the table. The rod $X^3$ is secured upon the outer ends of a series of screws, $Y^3$, which may be impelled forward or retracted by the finger-nuts $Z^3$. The screws $Y^3$ are sustained in parallel positions by being passed through the rod 5, attached to the side frames, B D. When it is desired to allow more space in the fold or bight $f^4$, caused by the rubber sheet $V^3$ passing under the short arms or rods $R^3$, and then forward under, around, and over the rod $W^3$, the screws $Y^3$ are worked forward by operating the nuts $Z^3$, allowing slack in the sheet or apron. If it is desired to tighten the apron or sheet $V^3$, and thus reduce the space or bight in the apron above mentioned, the screws $Y^3$ will be retracted.

Above the rear portion of the table $M^3$ is arranged across the machine, and at a point just below the sweep of the tilting bar G', the trough $a^3$, which preferably has a rounded bottom, and is widest at its upper edge. The trough $a^3$ is pivoted between the ends of the arms $b^3$, which swing upon a rod pivoted between the sides of the machine, and has a strap, $c^3$, passing from its upper front edge around under its bottom toward the rear, where it is secured on the rod $d^3$. The arms $e^3$ form a part of the arms $b^3$, and move with them. The arms $e^3$ hang downward from the arms $b^3$, and the latter are connected with the sides of the machine by the springs $f^3$, which give the arms an upward tension and return them and their connections to their former position after the arms $e^3$ have been forced downward by the ends of the axle of the roller $g^4$ striking their lower ends when the bars $Q^3$ are moved rearward. The roller $g^4$ is mounted between the castings $h^3$, which are formed on the upper ends of the bars $Q^3$, and travels back and forth with the said bars. The ends of the axle of the roller $g^4$ project beyond the outer faces of the castings $h^3$, forming studs. The object of the roller $g^4$ is to support the rear portion of the flexible sheet $V^3$ during the operation of the device. Upon the castings $h^3$ are pivoted the levers $i^3$, the forward ends of which rest upon the upper edge of the bars $N^3$, and are affected by traveling over the cams $O^3$. The rear ends of the levers $i^3$ pass downward in rear of the upper ends of the bars $Q^3$, where springs $j^3$, secured to the castings $h^3$ by screws $k^3$, impinge them, and cause the front ends of the levers $i^3$ to closely hug the upper edges of the bars $N^3$ and cams $O^3$. The tension of the springs $j^3$ may be adjusted by the screws $k^3$, whereby the sweep of the front ends of the levers $i^3$ may be regulated. When the bars $Q^3$ are forced rearward the axle $g^4$ strikes the lower ends of the arms $e^3$, carrying them rearward, which draws the arms $b^3$ downward. The arms $b^3$, when carried downward, draw the trough $a^3$ with them, whereby the said trough is caused to tilt toward the front by the strap $c^3$, and deposit its contents on the rear portion of the rubber sheet or apron $V^3$. This is the position of the trough $a^3$ and its connections which is shown in Fig. 3. After the ends of the roller $g^4$ have passed the lower ends of the arms $e^3$ the springs $f^3$ retract them upward to their former position, replacing the trough $a^3$ to its upright position. The strap $c^3$, above described, serves to allow the trough $a^3$ a definite movement, and prevents it from losing its relation to the other parts of the machine when tilted.

In front of and slightly below the front edge of the table $M^3$ is arranged, between the sides of the machine, the trough $l^3$, which will be widest at its top, and will consist of the ends and rear side, and the fingers $m^3$, which constitute the front side of the trough, and are secured upon the shaft $n^3$, which, when rotated toward the front, carries the lower ends of the fingers $m^3$ in a like direction, and permits the contents of the trough $l^3$ to fall through its bottom onto and between the two corresponding series of revolving knives $o^3$, which are secured upon the shafts $p^3$ and revolve toward each other.

On the right-hand ends of the shafts $p^3$ are secured gear-wheels $q^3$, whereby motion is communicated from one shaft to the other. The front gear-wheel $q^3$ receives its motion from the shaft S through the belt $r^3$ and band-wheels $D'$ and $s^3$.

It is proposed to employ five pairs of knives; but any number desired may be used, according to the length of the cigarettes to be produced.

Directly below the four spaces between the knives $o^3$ is secured a chute or trough, $t^3$, which conducts the cigarettes as they fall from the knives to any suitable receptacle placed to receive them. At the ends of the trough or chute $t^3$ are secured the chutes $u^3$, which receive the stubs or waste ends cut from the cigarettes by the two pairs of end knives $o^3$ and conduct them to a separator, $w^3$, which is a rectangular-shaped receptacle having a bottom of woven wire or other material that will act as a sieve. The front ends of the separator $w^3$ will be connected in an adjustable manner to the rocking arms $x^3$ by the threaded bolts $y^3$, which pass through apertures in the ends of the arms $x^3$, whereby they are retained, and are capable of vertical adjustment by the nuts $z^3$. By adjusting the threaded bolts $y^3$ vertically the elevation of the front portion of the separator $w^3$ may be regulated at will. The rear portion of the separator $w^3$ is secured to the lower arm of the bell-crank lever $A^4$, which is pivoted on the left-hand side of the machine, the other end of the said bell-crank lever extending forward and pivoted in the lower end of the pitman-rod $B^4$, connected with and driven by the pinion-wheel R. The rotation of the wheel T operates, through the wheel R and pitman $B^4$, to rock the bell-crank lever $A^4$, which has the effect of agitating the separator $w^3$, causing any tobacco that may be in the stubs of the cigarettes deposited in it by the chutes $u^3$ to be sifted through its bottom and thus saved, while the papers from said stubs accumulate at the rear end of the separator $w^3$ and gradually fall over its rear end, whence they are swept away.

In the description above given we have set out the operation of preparing the tobacco, feeding it forward in a sheet, cutting off a strip of tobacco and depositing it in the trough $a^3$. While this operation of preparing the strip of tobacco for the cigarette is being performed the paper for rolling the cigarette is fed inward over the paper-board $g'$ by the movement of the feed-rolls $y$, operated by the rack $B^2$ and cam $D^2$, as aforesaid, the extent of the paper fed being regulated by the stop $M^2$ and set-screw $N^2$. After the proper quantity of paper has been fed inward upon the bar $T^2$, forming a continuation of the paper-board $g'$, the arms $r'$ $s'$ will be acted upon by the cam $u'$ to draw through the chain $p'$ the carriage $k'$ across over the paper, cutting off a strip, as hereinbefore described, for the purpose of receiving the strip of tobacco aforesaid, or to serve as a wrapper. Just prior to the strip of paper being severed the rack $b^2$, which is actuated by the cam $e^2$ through the arm $d^2$, rotates the pinion $a^2$ and shaft $R^2$ to throw the clamps $S^2$ upward, over, and upon the rear surface of the bar $T^2$, the clamps in this position serving effectually to hold the rear portions of the strip of paper firmly and smoothly against the bar $T^2$ when the latter is in a horizontal position. The motion of the machine continuing, the cam $Z^2$ forces the rod $X^2$ downward against the lug $W^2$, which tilts the bar $T^2$ and the strip of paper rearward, as shown in Fig. 10 in full lines, the front edge of the strip of paper, which is left projecting over the flexible edge $h^2$ of the bar $T^2$, being in this movement touched against the paste roller $m^2$, whereby the said edge of the paper, for a space of about one-sixteenth of an inch, is covered with a thin layer of paste. In this movement of the strip of paper to the paste-roller $m^2$ the clamps $S^2$ turn with the tilting table or bar $T^2$ and retain the paper upon the same. At this point in the operation the cam $n^2$ will come in contact with the small wheel $D^4$, secured on the side of the machine, and in riding over it will elevate for a moment the paste-roller $m^2$ and rear portion of the paste-trough, whereby the said paste-roller is lifted up clear of the strip of paper without danger of tearing it. After the edge of the paper has received a layer of paste and the paste-roller has been elevated, as aforesaid, the springs $K^3$ on the ends of shaft $p^2$ operate to tilt the carriage $q^2$ forward, while the cam $r^2$, acting through the shaft $s^2$ on the arms $t^2$, brings the ends of the arms $x^2$ up in close relation to the ends of the strip of paper which is on the tilting bar $T^2$, and at the same time the cams $D^3$ draw on the levers $E^3$ and arms $I^3$, thereby overcoming the tension of the springs $B^3$ and opening the fingers $A^3$ from the ends of the arms $x^2$.

The arms $x^2$ are of such length that when they are thrust forward toward the ends of the paper-bar $T^2$ they will just reach the ends of the strip of paper, and when the fingers $A^3$ are open their inner ends will be on the front side of the said two opposite ends of the strip of paper. The cams $D^3$, when the arms $x^2$ and fingers $A^3$ are in this position, pass from contact with the levers $E^3$ and arms $I^3$, which allows the fingers $A^3$ to close upon the ends of the strip of paper, securely holding them against the arms $x^2$. At this point in the operation the lever $d^2$ of the rack $b^2$, operated by the cam $e^2$, will rotate, through the pinion $a^2$, the shaft $R^2$ toward the rear, thereby raising the clamps $S^2$ from the bar $T^2$ and strip of paper and lowering them out of the way. At the same time the cam $Z^2$ passes the rod $X^2$, and permits the spring $f^2$ on the end of the axle of the bar $T^2$ to throw the said bar into its former horizontal position against the edge of the bar $P^2$, into proper position to receive another strip of paper from the feed-rollers $y'$, after which the clamps $S^2$ are brought up and made to hold down the paper against it, as before. The movement continuing, the cam $e^4$ on shaft $p^2$ operates, through the lever $G^3$ and arm $F^3$, to tilt the upper end of the carriage $q^2$ rearward, when the arms $x^2$ carrying the strip of paper will fall into a vertical position, after which, the cam $e^4$ having passed its contact with the lever $G^3$, the springs $K^3$ will draw the upper portion of the carriage $q^2$ forward, which has the effect of thrusting the arms $x^2$ vertically downward, thereby carrying the said strip of paper downward and holding it very close and at a tangent to the front portion of the flexible sheet or apron $V^3$, which is resting upon the table $M^3$. At the same time, or a moment prior thereto, the ends of the shaft $g^4$ on frame $Q^3$ come in contact with the lower ends of the arms $e^3$, carrying them rearward, and consequently drawing the arms $b^3$ downward, which tilts the trough $a^3$, as aforesaid, and drops the strip of tobacco contained in it upon the rear portion of the flexible sheet $V^3$. This condition of the machine is shown in Fig. 3 of the drawings. After the ends of the axle $g^4$ pass the lower ends of the arms $e^3$ the spring $D^4$ retracts the arms $e^3$ $b^3$ and the trough $a^3$ to their former positions.

In the present condition of the machine the strip of paper has been cut off, its edge pasted, and is held close to the front upper surface of the flexible sheet or apron $V^3$, while the strip of tobacco, corresponding in length to the strip of paper, is resting transversely across the rear portion of the said flexible sheet $V^3$. The oscillating bars $Q^3$ are now brought forward on their bearings, which causes the fold or bight $f^4$ in the sheet or apron $V^3$ to travel toward the front over the table $M^3$. This movement of the fold $f^4$ is caused by the surface of the sheet traveling first rearward under the studs $R^3$, and then forward under and up over the roller $W^3$, owing to the bars $Q^3$ being moved on their bearings toward the front.

It will be observed that that portion of the sheet forming the upper half of the fold $f^4$ has a forward rubbing or frictional movement on the portion of the sheet $V^3$ constituting the lower half of the fold. As the bars $Q^3$ are moving forward, as aforesaid, the strip of tobacco which has been deposited on the rear portion of the sheet $V^3$ will be caught by the rubbing-surfaces of the fold $f^4$ and rolled into a round firm rod of tobacco. When the bars $Q^3$ have traveled sufficiently far to the front to permit the levers $i^3$ to ride down the rear cams, $O^3$, the two surfaces of the fold $f^4$ will be brought into closer contact with each other by the lowering of the roller $W^3$, the distance being regulated, according to the thickness of the strip of tobacco, by the screws $k^3$ impinging against the rear ends of the lever $i^3$, as aforesaid. Immediately after the levers $i^3$ pass down the rear cams, $O^3$, the studs $T^3$ ride down the side rear cams $P^3$, which permits the bars $S^3$ to drive the short rods $R^3$ inward, as before described. The rods $R^3$, passing inward over the sheet $V^3$ and into the fold $f^4$, strike the ends of the roll or strip of tobacco and force them, in a limited degree, toward each other, whereby the said ends are made firm, and are prevented from becoming ragged or loose. The strip of tobacco is now being rolled forward in the fold $f^4$ and between the ends of the short rods $R^3$ toward the strip of paper held by the arms $x^2$ at the front portion of the table $M^3$, and the movement of the machine being continued, the said strip of tobacco will be rolled onto the said strip of paper, which will be rolled around the strip of tobacco by the movement of the upper half of the fold $f^4$. After the roll of tobacco has reached the strip of paper and been partially wrapped in it, the studs $T^3$ ride up the side front cams $P^3$, and thereby withdraw the short rods $R^3$ from the roll of tobacco, so that the paper will not wrap around the short rods and the cigarette be broken in being removed. The tobacco having been rolled in the rear portion of the strip of paper, the cams $D^3$ operate, through the levers $E^3$ and arms $I^3$, to open the fingers $A^3$, when the strip of paper will be completely rolled around the strip or rod of tobacco and be retained thereon by its pasted edge, hereinbefore described, lapping onto the dry portion, forming a long cigarette. Upon the opening of the fingers $A^3$ at this point they loosen their hold upon the strip of paper, and are carried upward again to receive another strip from the bar $T^2$ by the cam $r^2$, acting through the shaft $s^2$ on the arms $t^2$.

The long cigarette, formed as above set forth, is rolled off of the front edge of the table $M^3$ by the forward movement of the bars $Q^3$ into the trough $l^3$, when the fingers $m^3$ will rotate toward the front, which allows the cigarette to drop centrally and evenly between the revolving knives $o^3$, which will sever the long cigarette into shorter cigarettes of the proper length, which will fall into the trough $t^3$ and be carried away, being now finished, while the stub ends of the long cigarette, which will be trimmed off by the end knives, will drop into the chutes $u^3$, and be delivered by them to the separator $w^3$, where the tobacco will be shaken from the papers, as aforesaid, and saved.

After the long cigarette has been rolled from the table $M^3$ into the trough $l^3$ the bars $Q^3$ return to their former positions and bring the sheet $V^3$ into proper relation to receive another strip of tobacco for another long cigarette. With every revolution of the axle E the mechanism is operated to form a long cigarette and cut it up into smaller ones of the proper length. The movements of the different elements of the machine are all automatic, it being only necessary to apply motive power, feed the tobacco, and provide a roll of paper.

The oscillating movement of the bars $Q^3$ above described will be imparted to them by the pitman $m^4$ from the wheel T mounted on the shaft E. The upper end of the pitman $m^4$ is secured eccentrically to the face of the wheel T, and its lower end is pivotally attached to the end of the arm $n^4$, forming a part of the bars $Q^3$. With every revolution of the wheel T the bars $Q^3$ have a forward-and-backward movement. The bars $Q^3$ are keyed on their shaft. Thus when one is moved the other is operated correspondingly.

The pressure of the belt $o$ on the tobacco passing below it on the apron $a$ may be regulated at will by adjusting the bearing of the roller $m$ vertically by means of the set-screws $p^4$.

If desired, some suitable means for stamping or otherwise applying the name or trademark of the cigarette to the paper at proper intervals as it is fed inward over the paper-board from the roll may be adopted.

For the purpose of keeping the strips of paper in a smooth condition when they are placed upon the table $M^3$ by the arms $x^2$, we have supplied the pivoted weighted arms $x^5$, the construction and operation of which are shown with sufficient accuracy in Fig. 10. When the arms $x^2$ are in an elevated position, as shown in said figure, the longer ends of the arms $x^5$ are in about a vertical position at right angles to the arms $x^2$, and as the latter arms are lowered the said longer ends of the arms $x^5$ gradually close down against them above the strip of paper in their lower ends, as indicated in dotted lines, and operate to prevent the paper from rising up as the strips are placed upon the segmental table.

What we claim as our invention, and desire to secure by Letters Patent, is—

1. In a cigarette-machine, a feed-trough suspended in a pivotal manner between arms which are capable of being actuated when the machine is in motion to shake the trough violently, said trough being also provided with an adjustable arm by which it may be inclined at will, and the quantity of tobacco issuing from its outlet thus regulated.

2. In a cigarette-machine, the trough F, suspended over the machine by the arms G, in combination with the rods L, pinion R, and pitman Q, and with the arm V, adjustable by a set-screw, X, substantially as set forth.

3. In a cigarette-machine, the combination, with an intermittently-moving apron, of a trough extending across the apron, and provided at its outlet with a rapidly-reciprocating plate, receiving its motion from the driving mechanism of the machine, substantially as specified.

4. In a cigarette-machine, the combination of the apron $a$, trough Z, plate $b$, adjustable rod $c$, spring-bar $e$, and cam $h$, substantially as specified.

5. In a cigarette-machine, a revolving paper-cutter mounted upon a carriage, in combination with an arm one end of which is suitably connected with the carriage and the other end arranged in proper relation to a cam on one of the shafts of the machine to be acted upon by it to draw the carriage back and forth, substantially as set forth.

6. The feed-rollers $y'$, having a simultaneous movement, one of them being supplied on its end with the ratchet $K^2$, pawl $J^2$, and pinion $A^2$, in combination with the rack $B^2$, formed on the arm $C^2$, which arm is actuated by a cam, and the sweep of which is controlled by the set-screw $N^2$ working in a rigid bearing, $M^2$, substantially as set forth.

7. The arm $C^2$, carrying the rack $B^2$, in combination with the cam $D^2$, adjustable stop $N^2$ on the frame of the machine, pinion $A^2$, ratchet $K^2$, pawl $J^2$, and rollers $y'$, substantially as described.

8. The combination, in a cigarette-machine, of the tilting bar $T^2$ and clamps $S^2$, the former operated by a cam acting through the rod $X^2$ and socket $W^2$, and the latter by a rack and pinion, substantially as set forth.

9. The tilting bar $T^2$, having its front edge tipped with a strip of flexible material, in combination with a paste-roller, substantially as described.

10. The tilting trough $i^2$, consisting of the paste-roller $m^2$ and a bottom which is adjustable with relation to the roller by screws $j^2$, in combination with the cam $n^2$ and wheel $D^4$, substantially as specified.

11. The rocking carriage $q^2$, having a spring-tension toward the front, mounted upon a shaft, and carrying the shafts $s^2 u^2$, in combination with the arms $x^2$, having spring-clamps at their lower ends, the arms $I^3 E^3$, cams $D^3$, arms $t^2$, cam $r^2$, arms $G^3 F^3$, and cam $e^4$, substantially as specified.

12. The oscillating bars $Q^3$, carrying the spring-bars $S^3$, studs $T^3$, and short rods $R^3$, in combination with the cams $P^3$, apron $V^3$, table $M^3$, and shaft $W^3$, substantially as set forth.

13. The oscillating bars $Q^3$, carrying in their upper portions the spring-pivoted levers $i^3$, having the shaft $W^3$ in their front ends, in combination with the cams $O^3$, apron $V^3$, bight $f^4$, and segmental table $M^3$, substantially as set forth.

14. The trough $a^3$, pivoted between the arms $b^3$ and $e^3$, in combination with the strap $c^3$, arms $Q^3$, and shaft $g^4$, substantially as specified.

15. The table $M^3$ and trough $l^3$, having the rocking fingers $m^3$, in combination with the two series of revolving knives $o^3$ and trough $t^3$, substantially as set forth.

16. In a cigarette-machine, the oscillating arms $x^2$, provided with the fingers $A^3$, adapted to receive and convey a strip of paper from the bar $T^2$, and supplied with the pivoted arms $x^5$, substantially as and for the purpose set forth.

17. The apron $a$, having an intermittent motion, and secured upon rollers $i\ j$, in combination with the plate $l$ and shafts $t$, adjustable vertically, and carrying the beaters $y$, as set forth.

18. The knife $A'$, secured between carriers $L'$, in combination with the cams $J'\ K'$, blocks $S'$, lever $W'$, cam $X'$, apron $a$, block $F'$, and tilting bar $G'$, substantially as specified.

19. The carriage $k'$, mounted upon guide-rods, and carrying the axle $l'$, having upon one end the cutter $m'$ and on the other the pinion $n'$, in combination with the rack $o'$ and a means for operating the carriage back and forth on the guide-rods, substantially as set forth.

20. The carriage $k'$, axle $l'$, cutter $m'$, pinion $n'$, and rack $o'$, in combination with the chain or belt $p'$, running on wheels $q'$, and with the arms $r'\ s'$ and cam $u'$, mounted upon the shaft $E$, substantially as specified.

21. In a cigarette-machine, the combination of the traveling knife $m'$, tilting bar $T^2$, clamps $S^2$, and paste-roller $m^2$, with their operating mechanism, as set forth.

22. In a cigarette-machine, the arms $x^2$, supplied with fingers $A^3$, rods $I^3$, links $E^3$, and springs $B^3$, in combination with the cams $D^3$, substantially as specified.

23. The table $M^3$ and trough $l^3$, having the fingers $m^3$, in combination with the trough $t^3$, chutes $u^3$, and a shaking-separator, $w^3$, as described.

In testimony that we claim the foregoing improvement in cigarette-machines, as above described, we have hereunto set our hands this 1st day of October, 1880.

JOHN COWMAN.
EDGAR SIDE.

Witnesses:
CHAS. C. GILL,
ROWLAND COX.